United States Patent [15] 3,655,098
Schnitzler [45] Apr. 11, 1972

[54] METHOD OF AND AN APPARATUS FOR THE FORMATION OF LAYERS OF COMMINUTED MATERIALS

[72] Inventor: Ulrich Schnitzler, Reichenbach, Germany
[73] Assignee: Dr. Erwin Schnitzler, Karlsruhe, Bannwaldallee, Germany
[22] Filed: Oct. 6, 1969
[21] Appl. No.: 864,147

[30] Foreign Application Priority Data

Oct. 5, 1968   Germany......................P 18 01 533.3
Aug. 12, 1969  Germany......................P 19 40 967.7

[52] U.S. Cl..................................222/135, 222/56, 198/57
[51] Int. Cl..........................................................B67d 5/52
[58] Field of Search.................................222/55–56, 410, 222/135; 198/57

[56] References Cited

UNITED STATES PATENTS

| | | | |
|---|---|---|---|
| 2,737,997 | 3/1956 | Himmelheber et al. | 222/56 X |
| 2,822,024 | 2/1958 | Himmelheber et al. | 222/55 X |
| 2,822,028 | 2/1958 | Himmelheber et al. | 222/55 X |
| 2,920,355 | 1/1960 | Clark | 222/55 |
| 2,923,030 | 2/1960 | Himmelheber et al. | 222/55 X |
| 3,072,293 | 1/1963 | Greten | 222/55 |
| 3,497,113 | 2/1970 | Braccolino et al. | 222/410 X |

*Primary Examiner*—Evon C. Blunk
*Assistant Examiner*—Hadd S. Lane
*Attorney*—Karl F. Ross

[57] ABSTRACT

A method of and an apparatus for the formation of layers of comminuted materials, e.g. sawdust, wood and other cellulosic fibers and like materials adapted to be compacted into pressed board, wherein a stationary pile of the loosely comminuted material in a substantially steady state is formed on a movable conveyor surface and/or transferred to such a surface without substantial free fall. The pile may be formed by drawing the comminuted material from a dispenser by an upwardly moving conveyor and passing through a homogenization stage before it is accumulated upon the surface.

5 Claims, 2 Drawing Figures

METHOD OF AND AN APPARATUS FOR THE FORMATION OF LAYERS OF COMMINUTED MATERIALS

FIELD OF THE INVENTION

My present invention relates to a method of and an apparatus for the formation of continuous layer of comminuted material and, more particularly, to the formation of layers of sawdust, wood particles, wood fibers and cellulosic fibers adapted to be compacted to produce fiberboard and the like.

BACKGROUND OF THE INVENTION

In the production of "fiberboard", a term which is used herein to describe high-density and low-density materials for load-bearing and non-load-bearing applications in the formation of structures, partitions and the like, a layer of the comminuted material which may be constituted of particles or fibers, is compressed with or without the use of heat to form a dense board structure using the inherent bonding agent of the comminuted material or synthetic or natural bonding resins and adhesives added to the comminuted materials.

When, for example, high-density pressed board is manufactured, wood dust (sawdust) and particles, with or without wood fibers formed by the comminution of wood or the digestion of a pulpy mass, are combined with phenol-aldehyde resins or other thermosetting bonding agents and formed into substantially uniform layers which are subdivided into loosely coherent mats. The latter are pressed under heat and pressure in multiplaten presses into nonporous board structures.

In still other systems, high porosity, low-density board may be made from wood or cellulosic fibers, with or without sawdust and wood particles, by forming the aforementioned layers and compacting them under lesser pressures or in the absence of heat to a fraction of the reduction in thickness used in the manufacture of high-density board. Such boards are referred to generally as fiberboard.

Between these two extremes, a variety of structural materials is possible, depending upon the proportion of fiber to wood dust, the use of the natural resins (abietic resins) present in the wood or synthetic bonding agents, and the degree of heat and pressure used in forming the board.

It is also common to provide multiplayer or laminated structure in which layers of wood fiber or cellulosic fiber and layers of wood dust or sawdust or sawdust and wood particles are combined in superimposed relationship for whatever desired properties these layers are able to impart to the board. It is not uncommon, therefore, to provide a first surfacing layer of wood dust or wood particles, one or more inner layers of loosely piled wood fiber and an outer layer of wood dust or particles so that the composite board will have high surface qualities approaching those of high-density pressed board and an inner core of relatively porous quality corresponding, for example, to the thermally insulating characteristics of low-density pressed board.

In the formation of pressed board of all of the aforedescribed types, it has been the practice heretofore to form a fiber or particulate layer or mat (sometimes referred to as fleece) upon a continuously moving surface, e.g. the upper stretch of a conveyor belt, designed to carry the continuous layer through the processing stage prior to the final pressing of the layers to form the coherent board. In the formation of such layers it is the general practice to cast or strew the comminuted material in a cascade or a free fall over more or less considerable distances onto the receiving surface in one or more layers.

Such systems are fraught with disadvantages which are ascribed to the cascade method of forming the layer of comminuted material. For example, a mat or fleece of fibers or particles and dust produced with free fall onto the receiving surface always is characterized by inhomogeneities, irregularities and defects ranging from variations in the packing density of the layer to variations in layer thickness and from the presence of trapped air to the formation of craters and the like. These defects, if permitted to remain to the final pressing stage, give rise to nonuniformities and structural defects in the final board and must, therefore, be corrected by further processing stages if considerable waste is not to be sustained. It appears that, at least to a large measure, the defects are a result of the compression of the air cushion between the cascade of comminuted material and the receiving surface, or the displacement of the air out of the path of the cascading material onto the surface.

OBJECTS OF THE INVENTION

It is, therefore, an important object of the present invention to provide an improved method of forming layers of comminuted material, especially for use in the production of pressed board, wherein the aforementioned disadvantages are obviated.

A further object of my invention is the provision of an improved method of forming layers of wood or cellulosic fibers, wood dust and wood particles which are of uniform thickness, are homogenous, and are free from the air inclusions, craters and other imperfections mentioned earlier.

Still further, it is an object of this invention to provide a relatively simple and inexpensive method of forming homogenous layers of comminuted material upon moving surfaces and especially to form multilayer bands of such materials on conveyor belts and like receiving surfaces.

Another object of my invention is to provide an apparatus for carrying out the method of the present invention which is of low cost, is free from the tendency toward breakdown and is especially satisfactory in the production of continuous layers of the aforementioned type.

It is still a further object of the instant invention to provide an apparatus of the character described, adapted to produce homogenous layers of uniform thickness in cooperation with a receiving surface formed by a conveyor belt or band.

Another object of my invention is to provide an improved apparatus for the production of multilayer mats of wood or cellulosic fiber, wood dust and/or wood particles adapted to be compacted into pressed board and the like.

SUMMARY OF THE INVENTION

According to the present invention, the prepared comminuted material, e.g. wood or cellulosic fibers, wood dust, sawdust and wood particles adapted to be formed into pressed board, is deposited in a steady-state pile upon a continuously moving receiving surface, e.g. formed by a conveyor belt or band, which essentially draws the layer-forming portion of the comminuted material from the bottom of the pile so that between the pile and the receiving surface there is no cascade or free fall of the comminuted material.

It is an essential feature of this invention that the deposition of comminuted material on top of the pile and the advance of the receiving surface along the bottom of the pile be so synchronized and coordinated that the pile remains in a substantially steady state with a height greater than the thickness of the layer to be formed and does not migrate with the advance of the conveyor belt. In other words, a stationary pile of the loose material is formed upon the receiving surface which, according to one aspect of the invention, is the conveyor band designed to carry the layer through whatever preprocessing stages are desired (i.e. cutting the continuous layer into individual mats, etc.). Alternatively, a depositing conveyor may be employed to receive the stationary pile and to form the initial layer and may cooperate with the conveyor band of the processing path to transfer the layer to the latter without free fall and preferably with no relative movement of the receiving surface and the conveyor band of the processing path.

As noted earlier, it is an essential characteristic of the present invention that the comminuted material is not strewn onto the receiving surface nor cascaded in free fall onto the latter and, indeed, any free fall between the stationary pile and the receiving surface must be eliminated.

According to a further feature of my invention, the stationary pile of comminuted material, i.e. a wood fiber, sawdust, wood dust or other particles, cellulosic fiber and the like, is deposited upon the pile from above in a cascade over a drop which should be maintained as small as possible, although the height of this drop has not been found to be critical inasmuch as it does not appear to affect the formation of the layer, but merely the stability of the pile.

The cascade of comminuted material between a dispensing point and the stationary pile formed upon the receiving surface while causing some displacement of the air in the space between the pile and the dispensing outlet, has no adverse effect on the quality of the layer formed upon the receiving surface. Any inhomogeneities resulting from this cascade are, of course, eliminated in the transformation of the pile from below, into the continuous layer. When reference is made herein to a "stationary" pile, it should be noted that it is intended to describe a pile of comminuted material whose height and contours are maintained substantially constant once the pile has been formed and the steady-state layer formation commenced.

Advantageously, between the pile and the outlet of the dispenser, which may include a hopper or the like and the conventional means for feeding or metering the comminuted materials from this hopper onto the pile (see *Perry's Chemical Engineers' Handbook*, McGraw-Hill Book Company, Fourth Edition, pages 7–28 — 7–35), there is provided one or more homogenization stages in which the comminuted material, just prior to reaching the pile and immediately before contacting the top of the latter, is broken up.

Still another feature of the present invention resides in the means for forming the pile which makes use of a conventional supply hopper, the floor of which is formed with an upwardly moving dispensing belt whose upper end is located above the pile and constitutes the dispensing outlet of the system. Between this upper end of the upwardly inclined dispensing belt and the stationary pile, one or more sets of homogenization drums can be provided to break up any agglomerization of the comminuted material. The latter is prepared in the customary manner which is not material to the present invention.

As indicated earlier, the present invention is applicable to the formation of single-layer mats of fiber and like comminuted materials, as well as the production of multiple- or plural-layer mats in which the successive layers may be of different compositions with respect to the proportions of the wood particles and wood fibers. The layers of wood particles and wood fibers may alternate with one another and/or may flank one another to form a sandwich or laminated construction. In accordance with this aspect of the invention, the individual layers are superimposed one upon another on the processing conveyor band with the aid of individual depositing conveyors each of which forms the respective layer from a stationary pile of the corresponding comminuted materials in accordance with the principles previously developed.

Each of the depositing or layer-forming conveyors has a discharge end inclined downwardly from a horizontal stretch upon which the respective pile is mounted at an acute angle to the receiving surface of the processing conveyor band upon which previous layers may have been deposited by similar depositing conveyors upstream the processing path. The discharge end or tongue of the depositing conveyor preferably has a substantially sharp edge over which the noncoherent layer is passed to be placed on the synchronously moving processing conveyor without relative movement of the depositing conveyor surface and the processing conveyor surface and without free fall or substantial deflection of the layer.

As the present invention enables the formation of wood particle and wood fiber plates of greater homogeneity and isotropy than previous systems and without the difficulties encountered heretofore. Furthermore, the layers are of uniform thickness and substantially free from imperfections so that waste is significantly reduced.

In accordance with the apparatus aspects of my invention, the stationary pile of each depositing conveyor, or the processing conveyor when a single layer is desired, is confined at least in part by a housing extending above the horizontal surface of the conveyor and receiving the homogenizing assembly of drums or the like with ribs in substantially meshing relationship to break up conglomerations of the comminuted material.

The housing may be formed with a discharge slot extending over the entire width of the conveyor band and the desired width of the layer to be formed thereon to permit the layer to emerge from the housing in which the pile is continuously regenerated at the rate at which the layer-forming material is withdrawn. A cast-back drum or roller, in accordance with the invention, provides the full width of the discharge slot to maintain a constant thickness of the emerging layer and throw back any access of the comminuted material onto the adjacent flank of the pile of the loose material. As a consequence, the housing forms a receptacle for the loosely piled comminuted material, the floor of which is the moving band carrying the pile. The cast-back roller or drum may be formed with axially extending rows of radially projecting prongs, tines or spines (teeth) in the manner of a rotary rake designed not only to strip any access of the comminuted material from the desired thickness of the layer but also to form indentations or the like in the layer when the latter is designed to have a relatively rough surface as is often the case in the production of high-density pressed board. Since such pressed board may have a highly smooth surface on the opposite side, the receiving surface of the conveyor can be correspondingly smooth or polished.

In the housing above the stationary or steady-state pile, I may provide a metering arrangement of any conventional type (see the *Chemical Engineers' Handbook*, supra) in synchronism with the receiving conveyor, so arranged that the mound or pile of connected material is sustained without growth or reduction in height.

The homogenization assembly preferably includes a planar array of counterrotating drums with interfitting arrays of angularly spaced elements or teeth, the axes of the drums lying in a horizontal plane between the metering means and the pile and preferably closely above the latter.

DESCRIPTION OF THE DRAWINGS

The above and other objects, features and advantages of the present invention may become more readily apparent from the following description, reference being made to the accompanying drawing in which.

SPECIFIC DESCRIPTION

Figure 1:
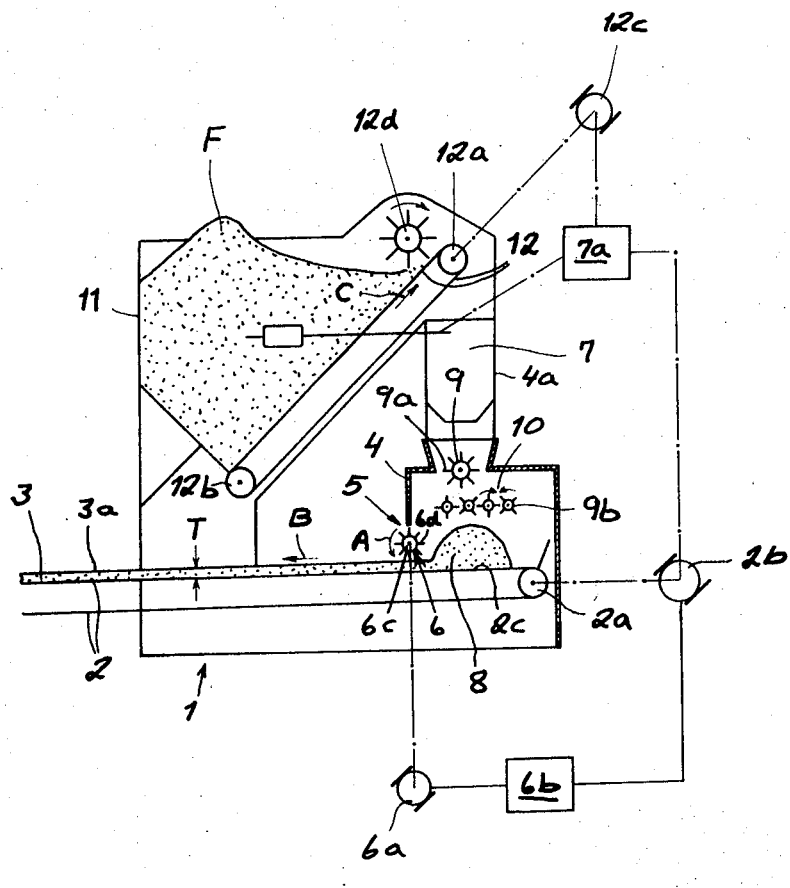
FIG. 1 is a vertical elevational cross-section, in diagrammatic form, of an apparatus embodying the present invention and designed for the production of single-layer mats of comminuted material.

The apparatus illustrated in FIG. 1 is designed for the production of a homogeneous isotropic layer 3 of comminuted material, e.g. wood fiber, wood dust, wood powder, cellulose fiber or the like to which a bonding agent has been added or containing a thermally activatable natural adhesive or bonding agent.

The apparatus comprises an endless processing conveyor 2 whose upstream end has a deflecting roller 2a and which is driven by a motor 2b. The downstream end of this conveyor, not shown, may form a processing path for the layer 3 in which this layer is subdivided into individual mats, prepressed and finally introduced into the various stages of a multiplaten press to form pressed board.

The layer 3 is formed, in accordance with the present invention, from a steady-state pile or mound 8 of the comminuted material which is maintained within a housing 4 constituting a receptacle whose outlet slot 5 is provided along the full width of the band 2, the upper stretch 2c of which extends horizontally and forms the floor of the receptacle.

Within the discharge slot 5, there is provided a cast-back roller or drum 6 which is driven by a motor 6a synchronized with the motor 2b via a controller 6b and rotated with a peripheral direction (arrow A) counter to the direction of displacement B of the layer 3. Any excess of the comminuted material above the desired thickness T is thus thrown back onto the mound or pile 8.

The cast-back roller or drum 6 is formed with a cylindrical body 6c from which eight angularly equispaced rows 6d of axially offset, mutually parallel radial tines, spines, teeth or spokes extend in rake-like arrays. Since these spines or spokes indent the upper surface 3a of the layer 3 in a uniform pattern, the surface of the layer is roughened to correspond to the desired surface of the finished board.

The entire assembly is provided within a housing 1 which also includes a metering arrangement generally represented at 7 for feeding the comminuted material to the pile 8. To this end, the housing 4 above the pile is provided with a shaft 4a receiving the metering arrangement 7 which is operated by the control 7a in synchronism or co-ordination with motor 2b to feed the comminuted material to the pile 8 at precisely the rate at which it is withdrawn in the layer 3. Below the metering device 7, there is provided a spoked homogenization drum 9 positioned within an outlet slot 9a of the housing 4a constituting a slight constriction in the path of the comminuted material. The final homogenization stage, adapted to break up agglomerations of the comminuted material, is formed by a plurality of spoked drums 9b (four in number) lying in a horizontal plane immediately above the pile 8 and rotating in alternately opposite senses with intermeshing arrays of spokes as represented by the arrows 10.

The housing 1 is further provided with the usual hopper 11 for the comminuted material F which is drawn upwardly (arrow C) by an upwardly and rearwardly inclined dispensing conveyor 12 passing over rollers 12a and 12b, the former of which may be driven by a motor 12c operated by the controller 7a at a rate such that the comminuted material drawn from the pile 8 in a continuous layer, is replaced in the metering device 7. The comminuted material is carried over the upper end of band 12 which may co-operate with a preliminary homogenization and cast-back drum 12d spaced above the upper end of this conveyor, to ensure proper carry-over of the comminuted material.

The device of FIG. 1 operates generally in the manner described above, in accordance with which a mound or pile 8 is formed on the surface 2c of the processing conveyor 2, whereupon this conveyor is started and the layer 3 generated. The critical feature of this invention is that the mound 8 is mounted in a steady state both with respect to height and configuration by continued addition of comminuted material at the top as the layer is formed, there being no free fall between the mound and the surface 2c.

Figure 2:
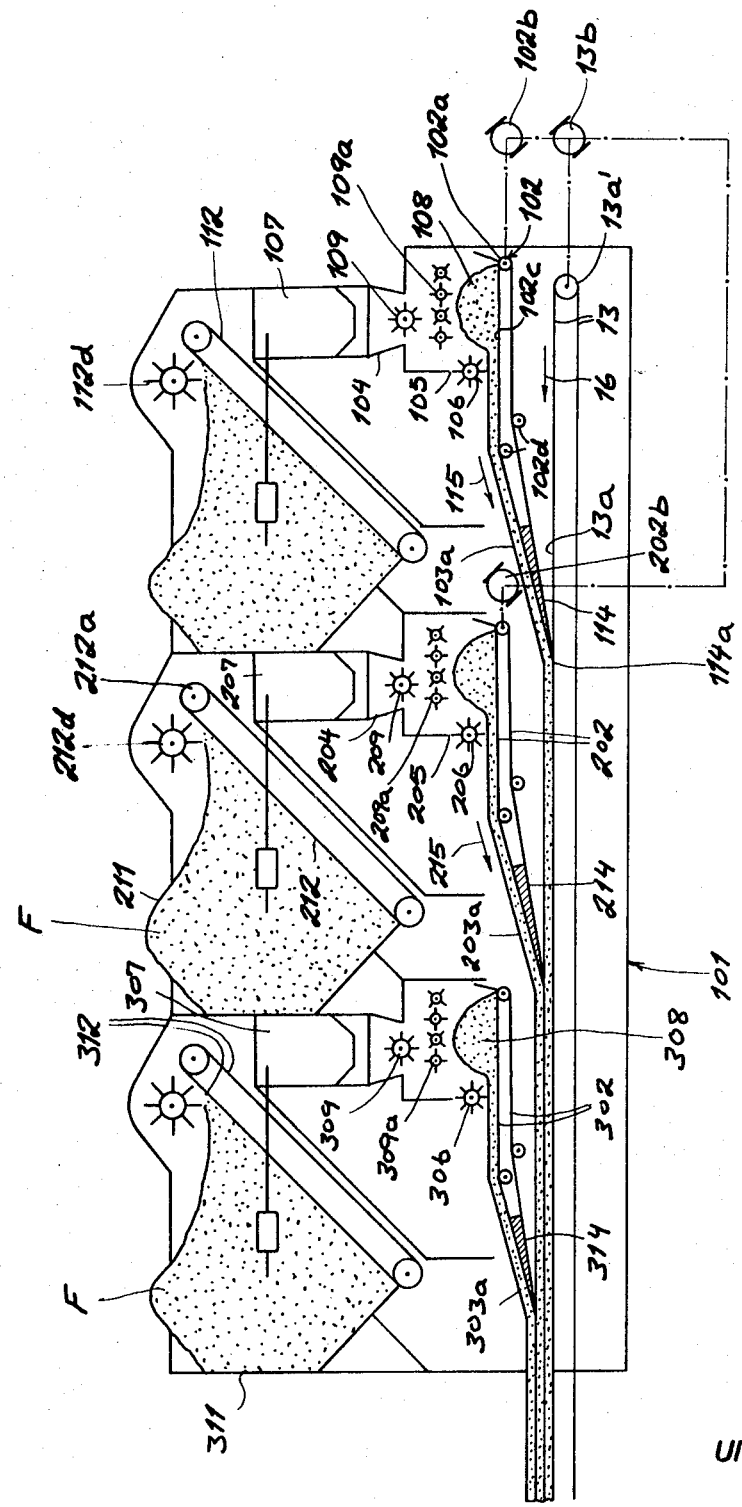
FIG. 2 is a view similar to FIG. 1 of a system for producing multilayer mats.

In FIG. 2, I have shown an embodiment of my invention for producing a multiplayer mat of wood particles (chips or sawdust) and cellulose or wood fibers. In this arrangement, which is generally similar to that of FIG. 1, a depositing band 102 is provided at the upstream end of the processing conveyor belt 13 whose upstream roll is shown at 13a and is driven by a motor 13b synchronously with the motor 102b of the depositing band 102 whose upstream roller is represented at 102a and has a horizontal portion 102c forming the bottom of a housing 104 in which a pile 108 of the wood powder, particles or chips is mounted via a dispensing conveyor 112, a cast-back roll 112d, a metering arrangement 107 and a homogenizing assembly 109, 109a as previously described.

The homogenous and uniform thickness layer 103a emerging from the outlet slot 105 of the housing 104 is formed by the cast-back drum or roller 106 which has rake-like tines analogous to those of the cast-back drums 6 at its discharge end, the dispensing conveyor 102 passes over deflecting rolls 102d and has its upper surface displaceable in the direction of arrow 115, i.e. generally parallel to the direction 16 of movement of the receiving surface 13a of the processing conveyor 13. A transfer tongue 114 at the discharge end of the depositing conveyor 102 is inclined to the horizontal at an angle of at most about 15° and forms a sharp edge 114a about which the upper stretch of the conveyor 102 is deflected into its return stretch and which lays the layer 103 directly upon the receiving surface 13a of conveyor 13.

At a second station within the housing 101 and immediately downstream of the first station, fiber wool constitutes the comminuted material received in the hopper 211 so that the fiber layer 203a can be deposited on top of the layer 103a of particles in the formation of a layer system consisting of alternate layers of wood particles and wood fiber. As in the first station and as described in connection with FIG. 1, a dispensing conveyor 212 is inclined upwardly and rearwardly to carry the comminuted material over the discharge end 212a of the conveyor and beneath a cast-back drum 212d to form a cascade of the comminuted material through a relatively small distance into the mating device 207. From the latter, the comminuted material is fed via homogenizing drums 209 and 209a onto the pile 208 maintained in a steady state upon the conveyor 202 which co-operates with the cast-back drum 206 of the second stage. The layer 203a emerging from the slot 205 of the housing 204 is thus constituted of fibers and passes via the conveyor 202 whose motor 202b is driven synchronously with motor 13b and motor 102b to deposit the layer 203a onto the layer 103a via the tongue 214 which permits no free fall of the comminuted material as it is laid upon the underlying layer.

Still further downstream, another layer 303a of wood particles from hopper 311 is deposited upon the layer 203a. Here again, the dispensing layer 312 carries the comminuted material to a metering device 307 from which it passes the homogenizing rolls 309 and 309a to form a stationary mound or pile 308 upon the layer-forming conveyor 302 whose tongue 314 is positioned closely above the layer 203a. The conveyor 302 is synchronized with the band 13 as previously described. In each of the stations, the metering devices 107, 207, 307 are synchronized with the layer-forming conveyors 102, 202, 302 to maintain the respective piles 108, 208, 308 in a stationary or steady-state condition. Furthermore, relative movement of the conveyors 112, 212, 312 and the conveyor 13 is precluded so that no distortion of the layer occurs upon deposition onto the processing conveyor. The three-layer composite can then be processed in the manner previously described and finally pressed into plates or boards in a multiplated press.

The improvement described and illustrated is believed to admit of many modifications within the ability of persons skilled in the art, all such modifications being considered within the spirit and scope of the invention.

I claim:

1. A method of forming a uniform laminar stack of layers of comminuted material, comprising the steps of:
   depositing a first pile of comminuted material upon a moving first surface and withdrawing a first layer of comminuted material from the bottom of said pile;
   depositing said first layer on a conveyer without free fall of the material of said layer by leading said surface in the form of a tongue into close juxtaposition with said conveyer;
   depositing a second pile of comminuted material on another moving surface and withdrawing a second layer from the bottom of said second pile on said other surface;
   leading said second layer without free fall onto the first layer deposited on said conveyer by juxtaposing a tongue forming part of the second surface with said first layer on said conveyer at a distance from said conveyer substantially equal to the thickness of said first layer thereon; and
   feeding additional comminuted material to the tops of each of said piles to maintain the same in substantially steady-state condition during the continuous withdrawal of said layers therefrom.

2. An apparatus for forming a uniform laminar stack of layers of comminuted material, comprising:

a continuously moving first surface;

means forming a first pile of the comminuted material upon said first surface whereby said surface draws a layer of the material from the bottom of said pile;

a conveyer moving generally in the direction of movement of said first surface, said first surface being formed with a tongue reaching substantially to said conveyer for depositing said first layer thereon without free fall;

a second surface continuously moving generally in the direction of movement of said conveyer and formed with a tongue reaching substantially to the top of said first layer on said conveyer and spaced at a distance from said conveyer equal approximately to the thickness of said first layer;

means forming a second pile of said comminuted material on said second surface whereby said second surface draws a second layer of the material from the bottom of said second pile and feeds it via the tongue of said second surface without free fall onto said first layer on said conveyer; and means for feeding additional comminuted material to the tops of each of said piles to maintain the same in substantially steady-state condition during the withdrawal of said first and second layers therefrom.

3. The apparatus defined in claim 2, wherein said means for feeding additional comminuted material to the tope of each of said piles includes a respective metering device above the respective pile for supplying the comminuted material to the latter substantially at the rate at which comminuted material is withdrawn from the pile, at least one pair of oppositely rotating tined rollers with an intermeshing set of tines and rotating in opposite senses directly above each of said piles between the pile and the respective metering device, and synchronizing means operatively connecting each of said metering devices with the respective surface for maintaining the feed of comminuted material to said pile in synchronism with the amount of comminuted material withdrawn therefrom.

4. The apparatus defined in claim 3, further comprising a respective cast-back roller deposited above each of said surfaces for returning excess comminuted material to the respective pile, said cast-back rollers each being provided with a plurality of angularly equispaced rows of mutually parallel, axially spaced radial spokes.

5. The apparatus defined in claim 2, wherein each of said surfaces forms part of a respective layer-forming conveyer, said apparatus further comprising means for synchronizing the conveyers for joint movement.

* * * * *